United States Patent [19]

Ishida

[11] 4,231,329
[45] Nov. 4, 1980

[54] APPARATUS FOR ATOMIZING FUEL IN AN INTERNAL COMBUSTION ENGINE

[75] Inventor: Yasuhiko Ishida, Mishima, Japan

[73] Assignee: Toyota Jidosha Kogyo Kabushiki Kaisha, Aichi, Japan

[21] Appl. No.: 966,122

[22] Filed: Dec. 4, 1978

[30] Foreign Application Priority Data

Mar. 7, 1978 [JP] Japan .................. 53-24989

[51] Int. Cl.³ ............................ F02B 27/00
[52] U.S. Cl. .................. 123/52 MB; 123/548; 123/591
[58] Field of Search ............ 123/122 AC, DIG. 2, 123/52MB, 131, 141

[56] References Cited

U.S. PATENT DOCUMENTS

| 1,544,801 | 7/1925 | Brown | 123/122 AC |
|---|---|---|---|
| 1,860,373 | 5/1932 | Timian | 123/122 AC |
| 2,083,752 | 6/1937 | Trussell | 123/122 AC |
| 2,745,394 | 5/1956 | Holley | 123/122 AC |
| 3,640,257 | 2/1972 | Cornelius | 123/DIG. 2 |
| 3,709,202 | 1/1973 | Brown | 123/DIG. 2 |
| 3,929,111 | 12/1975 | Turner et al. | 123/DIG. 2 |
| 3,990,414 | 11/1976 | Malphettes | 123/52 MB |
| 4,020,811 | 5/1977 | Laforce | 123/122 AC |
| 4,132,207 | 1/1979 | Pettengill | 123/122 AC |

Primary Examiner—Ira S. Lazarus
Attorney, Agent, or Firm—Armstrong, Nikaido, Marmelstein & Kubovcik

[57] ABSTRACT

An apparatus for improving atomization of fuel in an internal combustion engine, which apparatus has a pressure accumulation chamber connected to an intake passageway of the engine via a one-way valve and a first passageway of large flow area. The pressure accumulation chamber is also connected to the intake passageway via a second passageway of small flow area. The pressure accumulation chamber is maintained at a pressure which is close to a maximum pressure in the intake passageway. Thus, a fluid is intermittently ejected from the second passageway of small flow area into the intake passageway, thereby atomizing fuel of liquid condition therein.

11 Claims, 6 Drawing Figures

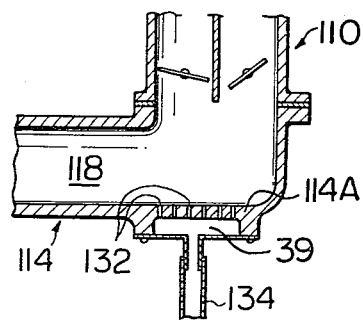
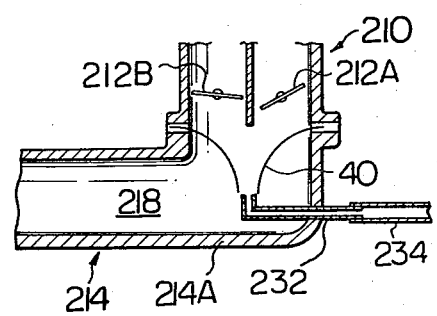
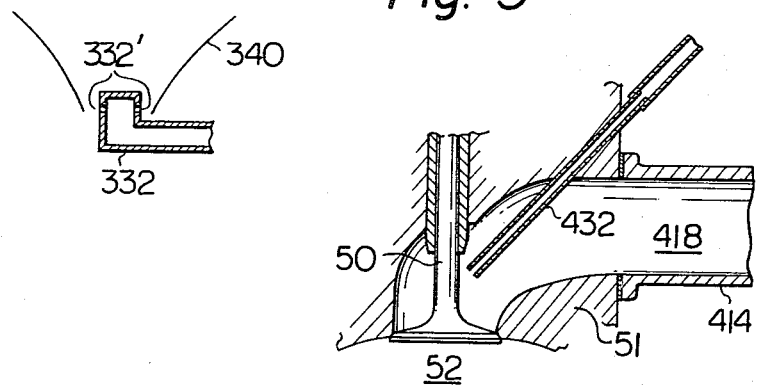

APPARATUS FOR ATOMIZING FUEL IN AN INTERNAL COMBUSTION ENGINE

FIELD OF THE INVENTION

The present invention relates to an apparatus for generating ejection of a flow of combustible mixture directed to an intake passageway of a carburetor type internal combustion engine, without utilizing any additional flow of air introduced into the engine from the outside. The apparatus is advantageously utilized for atomizing a fuel (gasoline) of liquid form in the intake passageway.

BACKGROUND OF THE INVENTION

In a gasoline engine, atomization of fuel is not completely effected at a carburetor. Therefore, the fuel, which is not atomized, is introduced into combustion chambers in a liquid condition along the inner surface of an intake passageway of the engine. In this case, the fuel can not be uniformly supplied to each cylinder of the engine, and the fuel can not be uniformly supplied to every portion of a cylinder. This causes an unstable combustion and a low engine efficiency, as well as a large emission of HC and CO components.

In prior arts, various systems are used for atomizing fuel, wherein an additional flow of air from the outside of the engine is ejected into an intake passageway of the engine under the action of vacuum pressure therein, in order to generate turbulence of the flow of the combustible mixture or to blow off a fuel contacting the inner wall of the intake passageway (Japanese Laid-Open Utility Model Registration Publication No. 52-57131, Japanese Laid-Open Patent Publication No. 50-18825, Japanese Utility Model Publication No. 51-12578 and Japanese Utility Model Publication No. 51-10245). These prior arts, however, suffer from a disadvantage that it is difficult to maintain a predetermined constant air-fuel ratio of the combustible mixture directed to the combustion chambers of the engine, since the vacuum pressure in the intake passageway, which corresponds to the amount of the externally introduced air, is changed in accordance with the load of the engine.

SUMMARY OF THE INVENTION

An object of the present invention is to provide an apparatus for atomizing fuel in a carburetor type internal combustion engine, which does not utilize any additional flow of air which is externally introduced into the engine.

Another object of the present invention is to provide an apparatus for generating a flow of combustible mixture diverted from an intake passageway of the engine and re-introduced into the intake passageway.

Still another object of the present invention is to provide an intake system for an internal combustion engine of carburetor type, capable of maintaining a constant air-fuel ratio of a combustible mixture introduced into combustion chambers.

A further object of the present invention is to provide an internal combustion engine having a high engine efficiency and a low amount of emission of toxic components.

According to the present invention an apparatus is provided for improving atomization of fuel in an air-fuel mixture passing through an intake line of an internal combustion engine, said apparatus comprising: a first passageway means opened to the intake line at a first position thereof; a second passageway means opened to the intake line at a second position thereof, the flow area of the second passageway means being smaller than that of the first passageway means, and; pressure accumulator means located between the first and the second passageway means for producing a pressure in the pressure accumulator means, which pressure is close to a maximum pressure in the intake line, thereby generating an intermittent flow of air-fuel mixture ejected to the intake passageway via the second passageway means. Thus, a fuel of fluid form in the intake line is atomized by the intermittently ejected flow, without utilizing any flow of air introduced into the engine from the outside.

BRIEF DESCRIPTION OF THE ATTACHED DRAWINGS

FIGS. 2 through 5 illustrate other embodiments of the present invention, respectively.

DETAILED DESCRIPTION OF PREFERRED EMBODIMENTS

Figure 1:
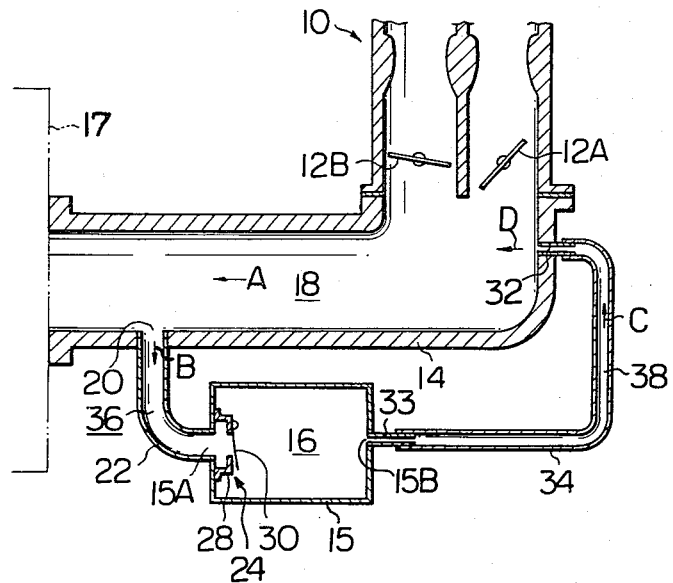
FIG. 1 is a cross sectional view of an apparatus for atomizing fuel according to the present invention.

Referring to FIG. 1, an internal combustion engine includes a combined type carburetor in which throttle valves 12A and 12B are arranged. An intake manifold 14 is located below the carburetor for receiving an air-fuel mixture therefrom. A downstream end of the intake manifold 14 is connected to an engine body 17 for introducing the air-fuel mixture into combustion chambers, not shown in FIG. 1.

According to the present invention, an apparatus is provided for forcibly atomizing the combustible mixture passing through an intake passageway 18, as shown by an arrow A, without utilizing any additional flow of air introduced into the intake passageway 18 from the outside. The reference numeral 15 designates a casing defining therein a pressure accumulation chamber 16 adapted for a pressure source generating a flow of the combustible mixture diverted from the intake passageway 18 and re-introduced thereto. A divergence port 20 is formed in the intake manifold 14. A pipe 22 is, on one end thereof, connected to the port 20 for diverting a part of the combustible mixture in the intake passageway 18 into the pipe 22. The other end of the pipe 22 is connected to an opening 15A, formed on one end of the casing 15. A one-way valve 24 is arranged in the casing 15. The one-way valve 24 is formed as a so-called reed valve which has a valve seat 28 fixedly mounted on the casing 15, so that the valve seat 28 can receive a flow of diverted fluid from the pipe 22, and has a valve member 30 made as a resilient reed member. The valve member 30 is, on one side of the valve seat 28 facing the accumulation chamber 16, fixedly connected to the valve seat 28 in a cantilever fashion, so that only flow of diverted fluid from the pipe 22 to be accumulation chamber 16 is allowed. Another opening 15B is formed in the casing 15 at a position opposite the opening 15A. The opening 15B is connected, via a connector 33, to one end of another pipe 34. The other end of the pipe 34 is connected to an injection port 32 formed as a nozzle fixedly inserted to the intake manifold 14 at a position separate from the divergence port 20.

The first pipe 22 defines therein a divergence passageway 36 located on the upstream side of the accumlation chamber 16. The connector 33, the second pipe 34 and the nozzle 32 define therein an injection passageway 38 located on the downstream side of the chamber 16. It should be noted that a flow area of the injection passageway 38 is selected to be substantially smaller than that of the divergence passageway 36, as is clearly seen from FIG. 1.

The apparatus according to the present invention illustrated in FIG. 1 operates as follows.

Figure 1A:
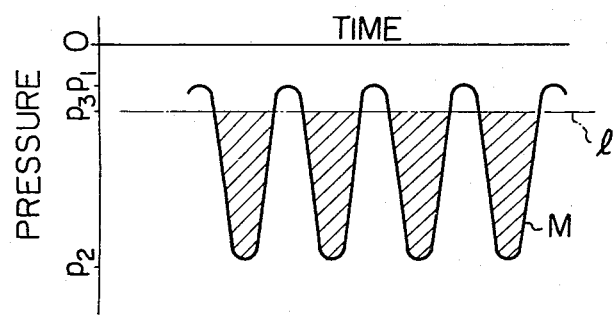
FIG. 1a is a graph showing a change of negative pressure in the intake passageway of the engine.

The intake passageway 18 is, as is well known to those skilled in this art, under a negative pressure which is, as schematically illustrated by a curve M in FIG. 1a, pulsatively changed between a maximum pressure p1 and a minimum pressure p2. When the pressure in the intake passageway 18 is close to the maximum pressure p1, i.e., close to atmospheric pressure, the valve member 30 is detached from the valve seat 28. Thus, the air-fuel mixture introduced into the diversion passageway 36 from the intake passageway 18, as indicated by an arrow B, is allowed to pass through the valve seat 28 into the accumulation chamber 16. When the pressure in the intake passageway 18 is close to the minimum pressure p2, i.e., remote from atmospheric pressure, the valve member 30 rests on the valve seat 28. Thus, the diversion passageway 36 is disconnected from the accumulation chamber 16, preventing the introduction of the combustible mixture into the chamber 16. In the case, the accumlation chamber 16 is substantially maintained under a pressure p3 (as indicated by a line l in FIG. 1a), which is close to the maximum pressure p1, since the flow area of the injection passageway 38, which always communicates the chamber 16 with the intake passageway 18, is smaller than the flow area of diversion passageway 36, which communicates with the chamber 16 via the one-way valve 24. Therefore, the pressure in the accumulation chamber 16 (indicated by the line l) is higher thanthe pressure in the intake passageway 18 (indicated by the curve M) at regions indicated by the shaded lines. Thus, a flow of combustible mixture from the injection passageway 38 to the intake passageway 14, as indicated by an arrow D, takes place intermittently at the region of the shaded lines. Due to the intermittent discharge of the flow of the combustible mixture, as indicated by the arrow D, a strong turbulence of in the flow of the combustible mixture directed from the carburetor 10 to the engine body 16, as indicated by the arrow A, takes place in the intake passageway 18. Thus, a liquid fuel directed from the carburetor 10 is effectively atomized, causing an increase in the combustionefficiency in the engine.

As will be clear from the above, atomization of the air-fuel mixture is, according to the present invention, effected by a flow of the combustible mixture diverted from the intake passageway 18 and re-introduced thereinto. In other words, an additional flow of air introduced into the engine from the outside thereof is not necessary. Thus, an advantage is obtained in that no variation of the air-fuel ratio determined by the carburetor occurs. When the engine is stopped, the accumulation chamber 16 is under a pressure substantially equal to atmospheric pressure. Therefore, a pressure difference between the accumulation chamber 16 and the intake passageway 18 is, just after the engine starts to operate, very large. Thus, an intermittent flow of the combustible mixture ejected from the nozzle 32, as indicated by the arrow D, due to the pressure difference is very strong. Consequently, atomization of the fuel from the carburetor 10 is effectively promoted, so that operation of the engine just after the starting of the engine is stabilized.

When the engine is decelerating, wherein the throttle valves 12A and 12B are both in idle positions, the pressure in the intake passageway 18 is very low. Therefore, a very large pressure difference is formed between the accumulation chamber 16 and the intake passageway 18. Consequently, the intermittent flow of combustible mixture is strongly discharged from the nozzle 32, causing the fuel in contact with an inner surface of the intake manifold 14 to be effectively atomized when the engine begins to decelerate. Therefore, a well mixed combustible mixture is introduced into the engine to be burnt in the engine under a stabilized condition, thereby preventing theoccurence of so-called "after burning".

In another embodiment illustrated in FIG. 2, a pipe 134, which is on one end thereof connected to a not shown accumulator similar to the accumulator 16 illustrated in FIG. 1, is on the other end thereof connected to a chamber 39 located below an intake manifold 114. A plurality of holes 132 are formed through the intake manifold 114, at a bottom portion 114A thereof located directly below the carburetor 110, so that the chamber 39 communicates with the intake passageway 118.

In the arrangement shown in FIG. 2, the combustible mixture is, under the same principal described above with reference to FIGS. 1 and 1a, intermittently ejected from the holes 132 into the intake passageway 118. A fuel of liquid form, which is apt to be located on the inner surface of the bottom portion 114A of the intake manifold 114, is effectively atomized by the flow ejected from the holes 132.

In still another embodiment, which is illustrated in FIG. 3, a metal net 40 of substantially truncated cone shape, which tapers to a bottom portion 214A of an intake manifold 214, is arranged below throttle valves 212A and 212B. A nozzle 232 of elongated shape projects into the intake passageway 218 via a side of an intake manifold 214. An inner end of the nozzle 232 is upwardly bent so that it faces the bottom tapering end, or narrow end, of the metal net tube 40. An outer end of the nozzle 232 is connected, via a pipe 234, to a not shown pressure accumulator chamber, similar to the chamber 16 in FIG. 1.

In the arrangement illustrated in FIG. 3, a fuel of liquid form from the carburetor 210 engages the net 40 and partly passes through the net 40 in am atomized condition. The liquid form of the fuel, whichdoes not pass the net 40, is directed to the bottom tapering end of the net 40, and is subjected to the flow of fluid which is intermittently ejected from the nozzle 232 under the previously described principal of the invention. Thus, the liquid form fuel is converted to the atomized form.

It should be noted that the arrangement of FIG. 3 can be combined with a conventional device for improving the atomization of the fuel, wherein the bottom portion 214A of the intake manifold 214 is warmed by hot water or exhaust gas. Such a device would be arranged below the bottom portion 214A of the intake manifold 214, as is well known to those skilled in this art.

In the modification of the embodiment of FIG. 3 illustrated in FIG. 4, a tip end of a nozzle 232, connected to a not shown accumulator chamber, is closed. A plurality of side holes 332', from which a flow of fluid is intermittently ejected, are formed in the nozzle 332 for atomizing the liquid fuel caught by a net 340 formed as a tapering tube.

In a further embodiment illustrated in FIG. 5, an elongated nozzle 432, connected to a not shown accumulator chamber of the present invention, extends into an intake passageway 418 of the engine at a position adjacent to an intake valve 50 located in an engine body 51. The intake valve 50 selectively connects the intake passageway 418 with a corresponding combustion chamber 52. When the engine is in a intake cycle, wherein the valve 50 operates to connect the intake passageway 418 with the combustion chamber 52, a strong suction force directed from the intake passageway 418 to the combustion chamber 52 is generated. Thus, a strong flow of fluid, which is ejected from the nozzle 432 under the principal of the present invention, reaches the combustion chamber 52, so that a turbulence in the combustible mixture is formed in the combustion chamber 52, causing the mixture to quickly burn therein.

While the embodiments of the present invention have been described herein with reference to the attached drawings, many modifications and changes can be made by those skilled in this art without departing from the scope of the invention.

What is claimed is:

1. An apparatus for improving atomization of fuel in an air-fuel mixture passing through an intake line of an internal combustion engine, said apparatus comprising:
   first passageway means opened to the intake line at a first position thereof;
   second passageway means opened to the intake line at a second position thereof, the flow area of the second passageway means being substantially smaller than that of the first passageway means, and
   pressure accumulator means located between the first and second passageway means for producing a pressure in the pressure accumulator means, which pressure is close to a maximum pressure in the intake line, thereby generating an intermittent flow of air-fuel mixture ejected to the intake passageway via the second passageway means, said apparatus forming a closed loop between said first and second positions with no openings to or from atmosphere.

2. An apparatus according to claim 1, wherein said pressure accumlator means comprises a chamber of a predetermined volume which is always connected to the second passageway means, and a one-way valve located between said chamber and the first passageway means, so that a flow of fluid from the first passageway means to the chamber is allowed.

3. An apparatus according to claim 2, wherein said one-way valve comprises a valve seat located between the first passageway means and the chamber, and a valve member made as a resilient reed member mounted to, in a cantilever fashion, the valve seat on one side thereof facing the chamber.

4. An apparatus according to claim 1, wherein said engine is provided with an intake manifold and a carburetor connected to the intake manifold, and wherein said second position, from which the flow of fluid passed through the second passageway means is intermittently ejected to the intake line, is located on a bottom portion of the intake manifold located directly below the carburetor.

5. An apparatus according to claim 4, wherein said bottom portion is provided with a plurality of holes connecting the intake line with the second passageway means.

6. An apparatus according to claim 1, wherein said engine is provided with an intake manifold and a carburetor connected to the intake manifold, and wherein the apparatus further comprises a net number which forms a tube of substantially truncated cone shape, the second passageways means extending to a position adjacent to a narrow end of the net member.

7. An apparatus according to claim 6, wherein said second passageway means comprises a pipe having an open end from which the flow of fluid is ejected.

8. An apparatus according to claim 6, wherein said second passageway means comprises a pipe member having a closed end, said pipe having side holes from which the fluid is ejected toward the net member.

9. An apparatus according to claim 1, wherein said engine is provided with a combustion chamber and an intake valve located between the intake line and the combustion chamber, and wherein said second passageway means extends to a position near the intake valve.

10. An intake system for an internal combustion engine, comprising:
    a carburetor having at least one throttle valve;
    an intake manifold arranged downstream of the carburetor for introducing an air-fuel mixture from the carburetor into the engine;
    a first passageway means connected to the intake manifold for diverting a part of the air-fuel mixture from the intake manifold into the first passageway means;
    an accumulator chamber of a predetermined volume;
    reed valve means located between the accumulator chamber and the first passageway means for allowing the diverted air-fuel mixture to pass into the accumulator chamber, and;
    a second passageway means for connecting the accumulator chamber with the intake manifold, the flow area of the second passageway means being smaller than that of the first passageway means, whereby the chamber is maintained under a pressure near a maximum pressure in the intake manifold, causing an intermittent flow of diverted air-fuel mixture to be generated, which intermittent flow is ejected into the intake manifold from the second passageway means.

11. An apparatus as in any of claims 1, 2, 3, or 10 wherein said engine is provided with an intake manifold and a carburetor connected to said intake manifold, and wherein said second passageway means is located on a side portion of said intake manifold.

* * * * *